United States Patent Office 3,054,814
Patented Sept. 18, 1962

3,054,814
OXIDATION OF HYDROCARBON
SYNTHESIS LIQUIDS
Emil F. Jason and Ellis K. Fields, Chicago, Ill., assignors to Standard Oil Company, Chicago, Ill., a corporation of Indiana
No Drawing. Filed Sept. 24, 1959, Ser. No. 841,960
4 Claims. (Cl. 260—413)

This invention relates to the catalytic liquid phase oxidation with molecular oxygen of hydrocarbon synthesis liquids obtained from the catalytic reduction of carbon monoxide and hydrogen at from 15 to 40 atmospheres' pressure over an iron catalyst; i.e., the liquid product obtained from the Fischer-Tropsch type synthesis, and more particularly pertains to such a liquid phase oxidation process employing a catalyst system comprising a source of bromine and a heavy metal oxidation catalyst.

The synthesis of hydrocarbons by the catalytic reduction of carbon monoxide and hydrogen has been long known. This synthesis was extensively developed in Germany to provide commercial production of gasoline hydrocarbons, diesel fuel and a source of paraffins. The synthesis at atmospheric pressure and temperatures below the level at which only methane is formed produces a high proportion, about 60%, of the synthesis liquid hydrocarbon of a low octane gasoline, about 30% of gas oil and about 10% of paraffin melting at 30 to 100° C. At medium superatmospheric pressure the German synthesis produced about 35% each of gasoline and gas oil and 30% paraffin. These processes are generally known as Fischer-Tropsch synthesis. One of the major commercial developments employing the catalytic reduction of carbon monoxide and hydrogen was the Hydrocol process which utilized an iron catalyst. This process was similar to the Fischer-Tropsch synthesis but markedly dissimilar in that it did produce higher octane gasoline. It was carried out at 15 to 40 atmospheres and at 300 to 375° C. with natural gas as the source for the mixture of CO and $H_2$. Its products were chiefly olefinic, boiling in the gasoline range. The liquid products of both the Fischer-Tropsch synthesis and the Hydrocol process contained non-hydrocarbon products. In the synthesis liquid of the Hydrocol process there were carbonyl compounds, hydroxyl compounds, as well as other oxygen-containing compounds in addition to the hydrocarbons produced. The oxygenated compounds in the liquids from the Hydrocol process amounted to up to about 20% of the liquid synthesis products. Both the Fischer-Tropsch synthesis and the Hydrocol process are more completely described in the literature.

The hydrocarbon components of the Fischer-Tropsch synthesis liquids and the Hydrocol process liquids are mainly (about 55 to 60%) olefinic in nature. The olefins vary from normal 1-olefins to tertiary and other branched olefins. The remaining hydrocarbons are normal and branched paraffins and even contain some aromatics.

In general, the hydrocarbon synthesis liquids were washed with water to remove water-soluble aliphatic alcohols, aldehydes and acids, and then dewaxed by extraction with organic solvents or by crystallization. Aliphatic acids which were not water-soluble were removed by washing with aqueous alkali. The mixture remaining could be fractionated into various cuts; i.e., a $C_3$ to $C_5$ cut, a $C_6$ cut, a $C_7$ cut, a $C_8$ cut, etc. wherein similar boiling materials could be separated. Each cut or fraction could be further separated into hydrocarbon and non-hydrocarbon components by chemical and physical means. The low and high molecular weight hydrocarbon fractions could be subjected to catalytic processes as are the comparable petroleum fractions to enhance their utility as gasoline components. Although hydrocarbon synthesis processes were successful commercially in Germany when the availability of crude petroleum was greatly limited, it was also technically successful but never attained commercial success in the United States for the manufacture of gasoline and diesel fuels because it was not economically competitive with the manufacture of such fuels from crude petroleum.

We have discovered that interesting, useful, novel acid products can be prepared from the various hydrocarbon fractions of the dewaxed, water-extracted, hydrocarbon synthesis liquids by liquid phase oxidation with molecular oxygen in the presence of a catalyst system comprising a source of bromine and a heavy metal oxidation catalyst. By such an oxidation, especially of the fractions containing an average of more than 5 carbon atoms per molecule, novel aliphatic acids containing both keto groups and carboxylic acid groups are obtained. The novel aliphatic acids are, in general, mono-olefinic diketo monocarboxylic acids containing more carbon atoms than in the feed stock oxidized. The oxidation process is carried out at temperatures of from 200 to 500° F. at pressures to maintain a liquid phase. The precise pressure is not critical but is a matter of choice as long as a liquid phase is maintained. Pressures of from 100 to 1000 p.s.i.g. or higher can be employed. It is also desirable to employ an acidic reaction medium or solvent. For this purpose an aliphatic monocarboxylic acid of from 2 to 8 carbon atoms, preferably acetic acid because of its resistance to oxidation and its availability, is preferred. The oxidation process can be carried out in the absence of a solvent or reaction medium, but the aliphatic acids produced are sufficiently high in molecular weight and viscosity that the reaction products are more readily handled when a reaction medium is employed.

For the process of this invention the $C_5$ and higher fractions of hydrocarbon synthesis liquids which have been dewaxed and water extracted are desirable. The fractions having less than 5 carbon atoms generally result in the formation of aliphatic acids of less carbon atoms than the feed stock, such as acetic and formic acids, or are oxidized completely to CO, $CO_2$ and $H_2O$. It is preferred to employ $C_8$ fractions and higher, say up to $C_{15}$ fractions, in the process of this invention.

The olefinic keto acids produced by the process of this invention may be employed as solvents or their esters may be employed as solvents, primary and secondary plasticizers for vinyl chloride polymers, vinyl acetate polymers, vinyl butyrate polymers, processing acids for rigid polymeric article fabrication, functional fluids when the olefinic double bond is saturated, among other similar uses for which aliphatic acid esters are employed.

Air is the most readily available source of molecular oxygen. However, substantially pure oxygen; i.e., commercial oxygen, oxygen plus ozone, mixtures of oxygen and inert gases, and mixtures of air and inert gases can be employed as the source of molecular oxygen for the process of this invention. Molecular oxygen-containing gases having from 5% to 100% oxygen by volume can be employed.

In the practice of this invention the catalyst system comprises bromine and a heavy metal oxidation catalyst. The bromine may be employed as elemental, combined, or ionic bromine. More specifically, as a source of bromine for the catalyst system there may be employed molecular bromine, ammonium bromide, hydrogen bromide, and other bromine-containing compounds soluble in the reaction mixture. Satisfactory results can be obtained, for example, by the use of potassium bromate, tetra-bromoethane, benzyl bromide and the like as a source of bromine.

The heavy metal oxidation catalyst portion of the catalyst system employed in the process of this invention includes the heavy metals and derivatives thereof which are soluble in the reaction medium to the extent necessary to provide a catalytically effective amount of the heavy metal oxidation catalyst component. The term "heavy metal" is employed herein in the same sense as employed in connection with the metals shown in the "Periodic Chart of Elements," appearing on pages 56 and 57 of the "Handbook of Chemistry," 8th edition, published by Handbook Publishers, Inc., Sandusky, Ohio (1952). From this group there have been found heavy metal oxidation catalysts desirably applicable to the process of this invention for furnishing the heavy metal oxidation component of the catalyst system. Of the heavy metal group, those metals having an atomic number not greater than 84 have been found most useful. Excellent results are obtained by the utilization of metals having an atomic number of from 23 to 28 inclusive. Particularly excellent results are obtained with a metal of the group consisting of manganese, cobalt, nickel, iron, chromium, vanadium, molybdenum, tungsten, tin and cerium. The catalytic amount of the heavy metal may be provided either by a single metal or a combination of the metals. The heavy metal oxidation catalyst component of the catalyst system in the process of this invention may be provided by the addition of the metal in elemental form, as its oxide or hydroxide, or in the form of a salt of the metal. For example, the metal manganese may be employed as the manganese salt of an organic carboxyloic acid, such as manganese naphthenate, manganese toluate, manganese acetate, etc., or in the form of an organic complex, such as the acetylacetonate, the 8-hydroxy-quinolate and the ethylene diamine tetra-acetate, as well as inorganic manganese salts such as the borates, halides and nitrates. The catalyst system may also be provided by the use of a heavy metal bromide or mixtures of heavy metal bromides.

The amount of metal catalyst employed is not critical and may be in the range of about 0.01 to about 10% by weight or more based on the feed stock reactant. Where the heavy metal is introduced as a bromide salt, for example as manganese bromide, the proportions of manganese and bromine will be in their stoichiometric proportions. The ratio of metal to bromine may be varied from such proportions within the range of about 1 to 10 atoms of heavy metal oxidation catalyst per atom of bromine to about 1 to 10 atoms of bromine per atom of heavy metal.

The amount of solvent or reaction medium employed will vary over wide limits as will be readily appreciated by those skilled in the art. The amount of solvent or reaction medium employed is not critical but typically will be in the range of from about 0.01 to about 10, desirably 0.05 to 1.0 times the weight of oxidizable feed stock.

In order to facilitate a clear understanding of the invention, the process of this invention is illustrated by the following preferred embodiments described in detail.

*Example*

A reaction system containing a reaction vessel having a means for measuring the temperature of the reactants contained therein, means for heating its contents, a bottom discharge port, a bottom air-charging line, a vapor conduit connecting its free-board space to a condenser, a condensate collector for separating condensate from uncondensed gases, a vent line for discharge of uncondensed gases through a pressure control valve and a condensate return line connected to the reactor, is employed. The oxidizable feed stock is a $C_{10}$ fraction of a dewaxed, water extracted and aqueous alkali washed hydrocarbon synthesis liquid containing by weight:

20% normal 1-olefins
12% other normal olefins
11% tertiary olefins
13% other branched olefins
6% normal paraffins
8% branched paraffins
9% aromatics
6% carbonyl compounds
6% hydroxyl compounds
9% other oxygen compounds The hydrocarbons contain 10 carbon atoms per molecule as do the "other oxygen compounds," the carbonyl compounds contain 8 carbon atoms per molecule, and the hydroxyl compounds are a mixture of $C_7$ and $C_8$ molecules. No molecule contains more than 10 carbon atoms. Such a mixture boils in the range of 159 to 184° C. at 757 mm. Hg.

To the reaction vessel there are charged 210 grams of the above $C_{10}$ fraction of the hydrocarbon synthesis liquid, 11 grams of glacial acetic acid, 0.84 gram of tetrabromoethane and 10 milliliters of an aqueous solution that is 0.25 molar in cobalt acetate and manganese acetate. The reactor is closed, and the pressure control valve is set about 400 p.s.i.g. The reaction mixture is heated to about 300° F. and air is passed into the reaction mixture at 2.74 liters per minute. Air flow is continued for about 5 hours during which time the temperature is maintained between 303 to 318° F. by the removal of heat by the reflux condenser system.

The reactor contents are cooled to about 30° C., filtered to remove a small amount of insoluble material, and then distilled. A forerun consisting of water and 43 ml. volatile organics is removed at atmospheric pressure. The remainder is stripped in vacuo and 28 grams of liquid are collected over a range of 38 to 91° C., at 1.5 mm. Hg. The residue is taken up with an excess of 5% aqueous potassium hydroxide. The insoluble material, 3 grams, is extracted with ether. The organic acid is liberated from the aqueous solution with dilute hydrochloric acid and is separated from the aqueous mother liquor. The sprung acid is taken up with ether, the ether solution washed with water, dried and stripped in vacuo at 130 to 140° C. and 1.0 mm. Hg. The residue, 108 grams, is a viscous, heavy, light-colored liquid. The analysis of this liquid product shows 68.17% carbon and 9.01% hydrogen, a molecular weight of 308±10 and a neutral equivalent of 266. From this carbon and hydrogen analysis and oxygen by difference, the product is a monoolefin diketo monocarboxylic acid having the empirical formula $C_{16}H_{26}O_4$ whose calculated carbon is 68.05% and hydrogen is 9.22% with a molecular weight of 282 and a neutral equivalent of 282.

Similarly other fractions of dewaxed, water and alkali washed hydrocarbon synthesis liquid, especially fractions whose aliphatic hydrocarbons (olefins and paraffins) contain 7 to 15 carbon atoms per molecule, may be converted to olefinic keto monocarboxylic acids of higher carbon content than the feed stock oxidized.

What is claimed is:

1. A process for the oxidation, as a feed stock, of a dewaxed, water and alkali washed fraction of a hydrocarbon synthesis liquid containing more than five carbon atoms per molecule and containing both olefinic and paraffinic hydrocarbons obtained from the catalytic reduction of carbon monoxide with hydrogen which comprises oxidizing said fraction in an oxidation zone at 200 to 500° F. with molecular oxygen in the presence of a catalyst system comprising bromine in a form selected from the class consisting of ionic, combined and elemental bromine and a heavy metal oxidation catalyst in the presence of an acidic reaction medium comprising a lower aliphatic monocarboxylic acid containing 2 to 8 carbon atoms while maintaining a liquid phase in said oxidation zone whereby a mono-olefinic keto monocarboxylic acid containing more carbon atoms per molecule than said feed stock is formed as the major product, and recovering said mono-olefinic keto monocarboxylic acid.

2. The process of claim 1 wherein said feed stock fraction the aliphatic hydrocarbons contain from 7 to 15 carbon atoms per molecule and the major product contains more carbon atoms per molecule than said feed stock fraction.

3. A process for the preparation of a mono-olefinic diketo monocarboxylic acid having the empirical formula $C_{16}H_{26}O_4$ which comprises oxidizing a fraction of a dewaxed, water and alkali washed hydrocarbon synthesis liquid, wherein said fraction the aliphatic hydrocarbons contain ten carbon atoms per molecule with molecular oxygen at 200 to 500° F. in the presence of acetic acid and in the presence of a catalyst system comprising tetrabromoethane and a mixture of cobalt and manganese acetates in an oxidation zone wherein a liquid phase is maintained, and recovering said mono-olefinic diketo monocarboxylic acid.

4. The process of claim 3 wherein the molecular oxygen is supplied by air.

References Cited in the file of this patent

UNITED STATES PATENTS

| | | |
|---|---|---|
| 2,644,837 | Schweitzer | July 7, 1953 |
| 2,725,344 | Fenske et al. | Nov. 29, 1955 |